United States Patent
Dewanjee

(10) Patent No.: US 6,793,867 B2
(45) Date of Patent: Sep. 21, 2004

(54) METHODS OF MANUFACTURING A GOLF BALL

(75) Inventor: Pijush K. Dewanjee, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 452 days.

(21) Appl. No.: 09/802,545

(22) Filed: Mar. 9, 2001

(65) Prior Publication Data

US 2001/0018376 A1 Aug. 30, 2001

Related U.S. Application Data

(63) Continuation-in-part of application No. 09/296,197, filed on Apr. 20, 1999, now Pat. No. 6,200,512.

(51) Int. Cl.[7] .............................................. B29C 61/04
(52) U.S. Cl. ..................... 264/490; 264/250; 264/279.1; 264/DIG. 65; 264/255
(58) Field of Search ................................. 264/490, 255, 264/250, DIG. 65, 279.1

(56) References Cited

U.S. PATENT DOCUMENTS

| | | | |
|---|---|---|---|
| 696,353 | A | 3/1902 | Richards |
| 3,068,522 | A | 12/1962 | Nickerson et al. |
| 3,112,521 | A | 12/1963 | Ward |
| 3,177,280 | A | 4/1965 | Ford et al. |
| 3,933,967 | A | 1/1976 | Taylor |
| 4,056,269 | A * | 11/1977 | Pollitt et al. ................. 473/372 |
| 4,653,758 | A | 3/1987 | Solheim |
| 4,714,253 | A | 12/1987 | Nakahara et al. |
| 4,858,924 | A | 8/1989 | Saito et al. |
| 5,002,281 | A | 3/1991 | Nakahara et al. |
| 5,006,297 | A | 4/1991 | Brown et al. |
| 5,048,838 | A | 9/1991 | Chikaraishi et al. |
| 5,194,191 | A | 3/1993 | Nomura et al. |
| 5,367,028 | A | 11/1994 | Hamada et al. |
| 5,390,932 | A | 2/1995 | Russo, Sr. |
| 5,439,227 | A | 8/1995 | Egashira et al. |
| 5,704,854 | A | 1/1998 | Higuchi et al. |
| 5,725,442 | A | 3/1998 | Higuchi et al. |
| 5,733,206 | A | 3/1998 | Nesbitt et al. |
| 5,779,562 | A | 7/1998 | Melvin et al. |
| 5,798,071 | A | 8/1998 | Boehm |
| 5,879,244 | A * | 3/1999 | Hwang ........................ 473/373 |
| 6,200,512 | B1 * | 3/2001 | Dewanjee et al. .......... 264/250 |

FOREIGN PATENT DOCUMENTS

JP 10-33716 * 2/1998

* cited by examiner

*Primary Examiner*—Edmund H. Lee
(74) *Attorney, Agent, or Firm*—Michael A. Catania; Elaine H. Lo

(57) ABSTRACT

A method of manufacturing golf balls is disclosed that prevents the cover from cracking due to thermal expansion of the core during the cover formation process. The method includes the forming a core. One or more optional boundary layers can be applied to the surface of the core. The core and any boundary layers are pre-heated such that the core and any boundary layer undergo volumetric thermal expansion. After the pre-heating, the cover of the ball is formed over the core and any boundary layer. The method of the present invention also decreases cover molding cycle times for golf balls.

14 Claims, 2 Drawing Sheets

METHODS OF MANUFACTURING A GOLF BALL

CROSS REFERENCES TO RELATED APPLICATIONS

This application is a continuation-in-part application of U.S. patent application Ser. No. No. 09/296,197, filed on Apr. 20, 1999, now U.S. Pat. No. 6,200,512, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates generally to golf balls. More specifically, the present invention relates to methods for manufacturing golf balls and golf balls manufactured thereby.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

Golf balls are typically manufactured by various molding processes, whether one-component or multicomponent balls. Generally, the core of the golf ball is formed by casting, compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, and/or injection molding.

One example of a conventional golf ball manufacturing process is described in U.S. Pat. No. 3,068,522, issued on Dec. 18, 1962 ("the '522 patent"). The manufacturing process disclosed in the '522 patent uses a molding press having upper and lower die portions that surround a golf ball core. A retractable seat contacts the golf ball core to place the same in the desired orientation within the die cavity. The cover material is then injected into the die cavity to form the cover of the ball. The '522 patent further discloses that the timing of the retraction of the retractable seat is critical and depends, in part, on the flow rate of the cover material into the mold cavity. In order to prevent the retardation of the flow rate or pre-hardening of the injected coating material, the '522 patent teaches that in some instances, it may be necessary to heat the molding dies and pre-heat the golf ball core to a temperature slightly above ambient temperature.

Another example, U.S. Pat. No. 5,194,191 ("the '191 patent"), issued Mar. 16, 1993 discloses a method of preparing thread-wound golf balls. In the '191 patent, a rubber thread or material is wound around a frozen core of material to form a core. Immediately thereafter, the core undergoes microwave heating to rapidly thaw the frozen core without heating the rubber thread layer and without moisture condensation taking place on the surface of the core. The method of the '191 patent allegedly reduces the core thawing time and eliminates the need for a drying step.

These and other current golf ball manufacturing processes continue to suffer from a number of disadvantages. For example, when the outer cover of the golf ball is made from a thermoset material, e.g., thermoset polyurethane, the core and any intermediate boundary layer(s) tend to undergo thermal expansion during the casting of the outer cover, as heat is generated by the exothermic reaction of the thermoset processes used in the formation of the cover. As the cover forms, and before the cover develops sufficient green strength, the thermal expansion of the core and any intermediate boundary layer, in turn, may cause the outer cover of the golf ball to fracture or crack. Although this problem is particularly relevant to covers that are formed of thermoset polyurethane, it is not believed to be limited thereto. Similar problems may arise with other materials and processes.

Cracking is not the only problem with the current conventional methods of manufacturing golf balls. Since a temperature gradient exists between the core, intermediate layer, if any, and the outer cover, the central portion of the ball acts as a heat sink that absorbs heat given off during the cover-making process. In this regard, the reaction that takes place to cure the outer cover takes longer given the cooler temperature in the inner core of the ball. Production cycle times are thus adversely increased.

Consequently, there remains a need for methods of manufacturing golf balls that do not suffer from the above disadvantages. Moreover, the methods would preferably decrease the cycle time between production runs.

BRIEF SUMMARY OF THE INVENTION

One aspect of the present invention is a method of manufacturing a golf ball. The method generally commences with heating a golf ball precursor product at a predetermined temperature and for a predetermined time period to achieve a predetermined volumetric thermal expansion of the golf ball precursor product. Next, a cover is applied over the thermally expanded golf ball precursor product.

The method may further include forming a golf ball precursor product. The forming of the golf ball precursor product may include forming a core and applying at least one boundary layer over the core. Alternatively, the forming of a golf ball precursor product may be limited to forming a core. The predetermined temperature may be a temperature within the range of about 135° F. to about 175° F., and more specifically a range of about 140° F. to about 160° F.

The at least one boundary layer may be a thermoplastic elastomer, and more specifically an ionomer. The cover may be a thermoset material, and more specifically a thermoset material with a resin from the group consisting of Allyl Pthalates like Diallyl Pthalates, (DAP) and Diallyl Iso Pthalates, (DIAP); Aminos; Cyanates; Epoxies; Phenolics; Unsaturated Polyesters; Bismaleimides; Polyurethanes; Silicones; Urethane Hybrids; Vinyl Esters; Liquid Nylon and Polydicyclopentadienes. The predetermined time period for heating may be about one hour at the predetermined temperature. The heating may be at a predetermined temperature and for a predetermined time period to achieve at least a 1.2% volumetric thermal expansion of the golf ball precursor product. Alternatively, heating the golf ball precursor product may be performed concurrently with forming the golf ball precursor product.

Another aspect of the present invention is a method of manufacturing a golf ball that includes forming a core, forming at least one boundary layer surrounding the core, and heating the core and boundary layer. The heating is conducted at a predetermined temperature and for a predetermined time period to achieve a predetermined volumetric thermal expansion of the core and at least one boundary layer. After heating, a cover is applied over the thermally expanded core and the at least one boundary layer.

Yet another aspect of the present invention is a golf ball having reduced susceptibility of cracking of a cover. The golf ball is produced in accordance with the method that includes heating a golf ball precursor product at a predetermined temperature and for a predetermined time period to achieve a predetermined volumetric thermal expansion of the golf ball precursor product. Next, a cover is applied over the thermally expanded golf ball precursor product.

It is the primary object of the present invention to provide a method for forming a golf ball that does not fracture during the cover forming process.

It is an additional object of the present invention to provide a method that preheats a core of a golf ball, and optional boundary layer, prior to forming a cover for the golf ball.

It is an additional object of the present invention to provide a golf ball that is formed by preheating the core of the golf ball, and optional boundary layer, prior to forming a cover for the golf ball.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

There is illustrated in FIG. 1 a perspective view of a core of a golf ball.

There is illustrated in FIG. 2 a perspective view of a golf ball precursor product having a cut-away portion to show a core encompassed by a boundary layer.

Figure 3:
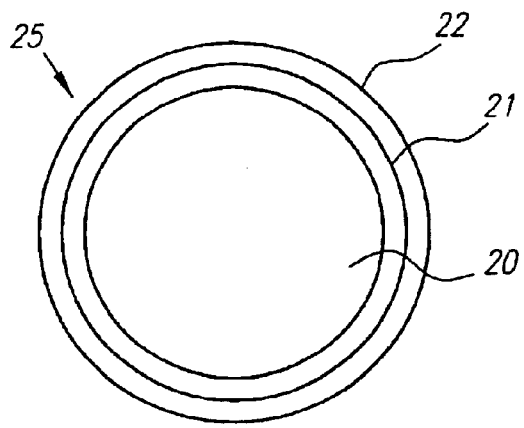

There is illustrated in FIG. 3 a perspective view of a golf ball having a cut-away portion to show a core and a boundary layer encompassed by a cover.

Figure 4:
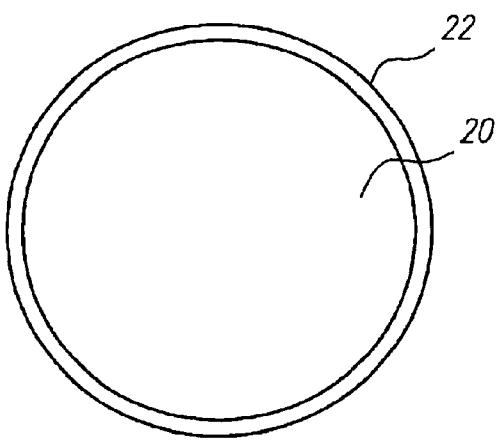

There is illustrated in FIG. 4 a perspective view of a golf ball having a cut-away portion to show a core encompassed by a cover.

Figure 5:
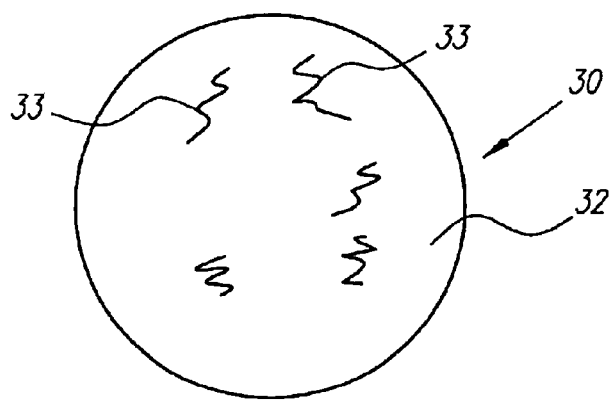

There is illustrated in FIG. 5 a golf ball produced by the process of the prior art.

Figure 6:
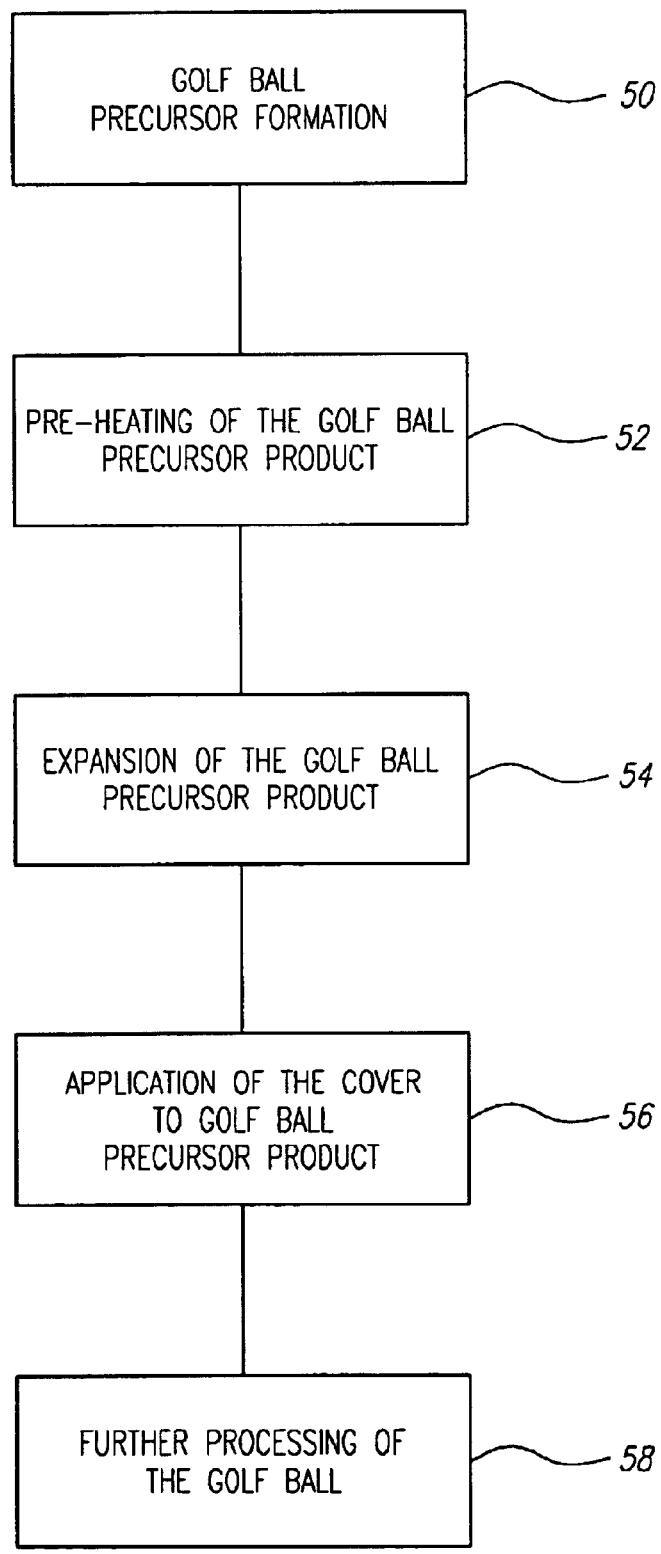

There is illustrated in FIG. 6 a block diagram of the method of the present invention.

DETAILED DESCRIPTION OF THE INVENTION

A golf ball may comprise a one-piece construction or it may include several layers including a core and an outer cover surrounding the core. The outer surface of the cover of the golf ball may include one or more pigmented or non-pigmented protective coatings. The outer cover of the golf ball is preferably made of any number of thermoplastic or thermosetting materials and more specifically a thermoset material with a resin from the group consisting of Allyl Pthalates like Diallyl Pthalates, (DAP) and Diallyl Iso Pthalates, (DAIP); Aminos; Cyanates; Epoxies; Phenolics; Unsaturated Polyesters; Bismaleimides; Polyurethanes; Silicones; Urethane Hybrids; Vinyl Esters; Liquid Nylon and Polydicyclopentadienes; thermoplastic or thermoset polyurethanes; natural or synthetic rubbers such as balata (natural or synthetic); polybutadiene; or some combination of the above. This list, however, is merely illustrative and shall not limit the types of materials suitable for use in the golf balls and methods of the present invention.

As described herein, the materials used in forming the golf ball, and the construction of the golf ball so formed, are not believed to be critical to the manufacturing methods and golf balls of the present invention. Nevertheless, the manufacturing methods of the present invention are particularly suited to manufacturing multi-component solid golf balls comprising a unitary solid rubber core, one or more intermediate boundary layer(s) comprising thermoplastic elastomer material(s), and a thermoset polyurethane cover. Golf balls of this type are described more fully in co-pending U.S. Pat. No. 6,117,024, entitled "Golf Ball With Polyurethane Cover", which has been assigned to the assignee of the present application, and which is hereby incorporated by reference in its entirety. Without intending to limit the scope of the present invention, the following description is directed primarily to the preferred multi-component golf ball and to methods of manufacturing the same.

Figure 1:
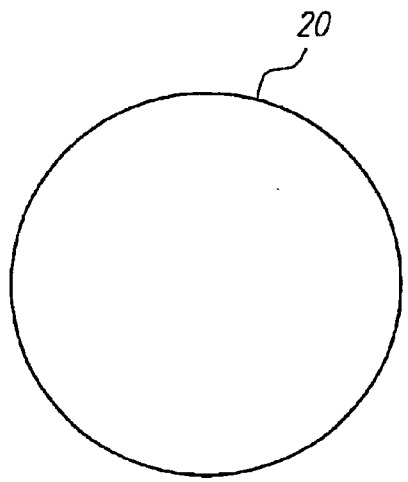
Figure 2:
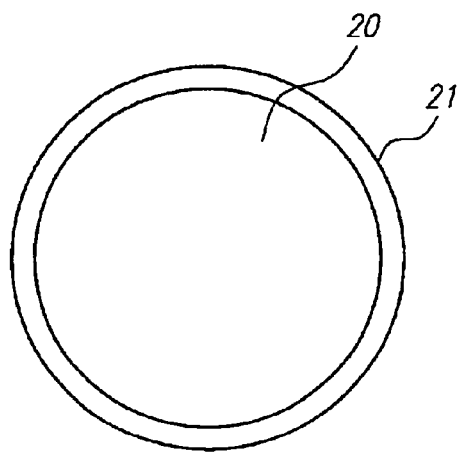

There is illustrated in FIGS. 1-4, a perspective view of golf balls at various stages of the golf ball fabrication process. As shown in FIG. 1, a core 20 is the initial component of a golf ball. As shown in FIG. 2, an optional boundary layer 21 may be molded over the core 20 at a subsequent stage of the golf ball fabrication process. As shown in FIG. 3, a cover 22 may be molded over the boundary layer 21 and core 20. Alternatively, as shown in FIG. 4, the cover 22 may be molded over only a core 20. Thus, a golf ball 25 of FIG. 3 has multiple layers, while a golf ball 25' of FIG. 4 is composed of only a core 20 and cover 22.

The core 20 of the golf ball 25 or 25' may be of any construction and use any materials suitable for use in a golf ball. For example, and without limiting the scope of the present invention, the core 20 may be of wound, solid, foamed, hollow, or fluid-filled construction.

In the preferred embodiment, the golf ball core 20 is of a single solid layer comprising a blend of a base rubber, a cross-linking agent, a curing agent, and one or more weight-adjusting and/or processing aid fillers. As the base rubber, it is preferred to use a polybutadiene having a cis 1,4 content of above about 90%, and more preferably 98% or above. Such materials are well known to those skilled in the art.

As the cross-linking agent, a large number of metal acrylate salts are known to those skilled in the art. For example, metal salt diacrylates, dimethacrylates, or mono (meth)acrylates are preferred for use in the golf ball cores 20 of the present invention, particularly preferred is zinc diacrylate. A commercial source of zinc diacrylate is SR-416, available from Sartomer Co., Inc. Other metal salt di- or mono- (meth)acrylates suitable for use in this invention include those in which the metal is calcium or magnesium.

Free radical initiators are used as curing agents to promote cross-linking of the base rubber and the cross-linking agent. Suitable free radical initiators for use in the golf ball cores of the present invention include peroxides such as dicumyl peroxide, bis-(t-butyl peroxy) diisopropyl benzene, t-butyl perbenzoate, di-t-butyl peroxide, 2,5-dimethyl-2,5-di-5-butylperoxy-hexane, 1,1-di (t-butylperoxy) 3,3,5-trimethyl cyclohexane, and the like.

Zinc oxide is also preferably included in the core formulation. Zinc oxide is primarily used as a weight adjusting filler, but is also believed to participate in the cross-linking of the other components of the core. Any of a number of specific gravity adjusting fillers may be included to obtain a preferred total weight of the core 20. Examples of such fillers include tungsten and barium sulfate.

Additional processing aids such as dispersants and activators may optionally be included. In particular, zinc stearate may be added as an activator.

Table 1 below provides the ranges of materials included in the preferred core formulations of the present invention. All of the components, except the polybutadiene, are given as parts per hundred parts of the polybutadiene.

TABLE 1

| Component | Preferred Range | Most Preferred Range |
| --- | --- | --- |
| Polybutadiene | 100 parts | 100 parts |
| Zinc diacrylate | 20–35 phr | 25–30 phr |
| Zinc oxide | 0–50 phr | 5–15 phr |
| Zinc stearate | 0–15 phr | 1–10 phr |
| Peroxide | 0.2–2.5 phr | 0.5–1.5 phr |
| Filler | As needed | As needed |

The core components are preferably mixed and compression molded in a conventional manner known to those skilled in the art. In a preferred form, the finished core 20 has a diameter of about 1.35 to about 1.64 inches for a golf ball 25 or 25' having an outer diameter of 1.68 inches. The core weight is preferably maintained in the range of about 32 to about 40 gm. The core PGA compression is preferably maintained in the range of about 50 to 90, and most preferably about 55 to 70.

One or more optional boundary layers 21 may be provided outside of the core 20 and inside of the cover 22. The boundary layer 21 may comprise any number of thermoset or thermoplastic materials known to those skilled in the art. Preferably, ionomeric materials such as one or more SURLYN® products available from DuPont, are used for the boundary layer 21. The boundary layer 21 preferably has a uniform thickness throughout and preferably ranges in thickness from about 0.025 inch to about 0.075 inch or more. The boundary layer 21 is fabricated by any number of processes, including casting, compression molding, injection molding, and the like.

As described above, existing methods for manufacturing golf balls have suffered from the disadvantage that the cover 22 fractures or cracks during the cover formation process due to the thermal expansion of the core 20 and/or any boundary layer 21. As shown in FIG. 5, a golf ball 30 of the prior art has a plurality of fractures or cracks 32 in its cover 33 due to thermal expansion of its core and any boundary layer subsequent to formation of the cover 32. The present invention provides a novel solution to this manufacturing problem.

The preferred method of the present invention is generally illustrated in FIG. 6. The method initially involves forming the core 20 and one or more optional boundary layers 21 of the golf ball 25 or 25' to create a golf ball precursor product as shown in block 50. The golf ball precursor product may be the core 20 alone, or the core 20 with one or more boundary layers 21. The formation of the golf ball precursor product may be performed with conventional molding apparatuses within the same facility as the cover molding apparatus, or alternatively at an off-site location. The golf ball precursor products, whether on-site or off-site, are then transferred to a location in proximity to the cover molding apparatus. After formation of the golf ball precursor product, it is pre-heated to a predetermined temperature for a predetermined time period as shown in block 52. The pre-heating is accomplished by applying heat to the core 20 and any boundary layers 21, preferably to induce thermal expansion thereof as shown in block 54. The pre-heating of the core 20 and boundary layers 21 may be achieved through any number of methods known to those skilled in the art. However, in the preferred embodiment, the core 20 and boundary layers 21 are pre-heated by convection heating in an oven. An alternative means for heating the golf ball precursor product is through use of microwave heating. In microwave heating, as compared to convection heating, the surface heating of the golf ball precursor products is greatly reduced if not eliminated. The reduction in surface heating eliminates the adhesion of golf ball precursor products to one another prior to application of the cover 22. It should further be appreciated that while the pre-heating is described as being after core formation, the present methods also contemplate heating the core 20 both during and after the formation of the golf ball core 20. In this manner, some of the heat that may be present or liberated in the core 20 from the core formation process may be used in the pre-heating of the core 20.

The thermal expansion of the golf ball precursor product results in the volume of the golf ball precursor product increasing from its initial size to a larger subsequent size. Preferably, the core 20 and any boundary layer 21 are pre-heated, prior to applying the cover 22, to a temperature of about 120° F. to about 175° F., and more preferably between about 140° F. to about 160° F. If using convection heating, the pre-heating preferably occurs for about one hour, or for such time as needed to achieve an amount of thermal expansion prior to cover formation such that the cover will not crack, and/or to achieve a desired improvement in cover molding cycle time, as described below. If using microwave heating, the predetermined time period is much less than convection heating. Microwave heating of a 1.60 inch golf ball precursor product for two minutes at a power of 700 Watts in a 0.7 cubic foot microwave will thermally expand the golf ball precursor product by 0.001 inches. Although the duration of the pre-heating is not believed to be critical, the above-mentioned preferred amount of time permits substantially even heating of the core 20 and any boundary layer 21, and results in substantially steady-state thermal conditions within the core 20 and any boundary layer 21.

While the temperature ranges and heating times disclosed above are the preferred ranges and times, it should be noted that the invention is not limited to any exact temperature or heating time. The purpose of the pre-heating is to subject the core 20 and any boundary layer 21 to an increase in temperature to result in volumetric thermal expansion of the golf ball precursor product. However, the temperature should be below the softening temperature of the materials of the golf ball precursor product. If a boundary layer 21 is utilized, the temperature is generally maintained below the softening temperature of the boundary layer 21. The expansion may occur within any number of absolute temperatures over any period of heating time that fall within the operability ranges of the materials used. For example, any temperature differential and heating time that causes a sufficient amount of thermal expansion of the golf ball precursor product may be used in practicing the present invention. The amount of thermal expansion preferred will vary depending on, at least, the cover material(s) and cover thickness to be used for manufacturing the golf ball 25 or 25'. For example, for a relatively rigid cover material or a relatively thin cover, it is preferable to cause a relatively larger amount of thermal expansion to the golf ball precursor product to substantially prevent cover cracking.

The volumetric thermal expansion of the core 20 and optional boundary layer 21 may be expressed as a percentage, according to the following:

$$\left[\frac{Vol_{final} - Vol_{initial}}{Vol_{initial}} \times 100\right]\% \quad (1)$$

where $Vol_{final}$ is the average volume of the core 20 or the core 20 and one or more boundary layers 21 at the high temperature, and $Vol_{initial}$ is the average volume of the core 20 or the core 20 and one or more boundary layers 21 at the lower, initial starting temperature. It has been found that a volumetric expansion of at least about 1.2% is substantially sufficient to prevent cover cracking when using a thermoset polyurethane cover material in a casting process, as described in co-pending U.S. Pat. No. 6,117,024 referred to above. It will be understood, however, that this is not intended to serve as a lower limit for the volumetric thermal expansion of the present methods. Instead, the lower limit of volumetric thermal expansion for a given system will depend on the materials, the golf ball construction (e.g., core diameter, boundary layer and cover thickness, etc.), and the molding processes utilized in the system. Determination of this limit for a given system is within the level of skill of those skilled in the art.

After pre-heating, the golf ball precursor products may be stored in a hopper disposed in proximity to the cover molding apparatus. The golf ball precursor products are then introduced to the cover molding apparatus for application of a cover 22 thereon as shown in block 56. The cover 22 is preferably applied while the core 20 and optional boundary layer 21 are at an increased temperature, and most preferably at the increased temperature obtained during the pre-heating thereof. As described above, the cover 22 may be composed of one or more of several different types of materials, and may be applied by any of several molding methods. In the preferred embodiment, the cover 22 is a thermoset material with a resin from the group consisting of Allyl Pthalates like Diallyl Pthalates, (DAP), and Diallyl Iso Pthalates, (DAIP); Aminos; Cyanates; Epoxies; Phenolics; Unsaturated Polyesters; Bismaleimides; Silicones; Urethane Hybrids; Vinyl Esters; Liquid Nylon and Polydicyclopentadienes that is applied in a cast molding process. As mentioned previously, the curing of the thermoset material to form the cover is an exothermic reaction. By incorporating resins from this group to the thermoset material it is possible to enhance the properties of the cover. In particular Allyl Pthalate resins like Diallyl Pthalates (DAP), and Diallyl Iso Pthalates (DAIP) offer good thermal stability capable of withstanding up to about 180° (DAP) or 220° (DAIP) for long periods as well as dimensional stability under conditions of dry and wet heat, whereas an Amino resin may confer improved hardness, durability, and alkali resistance. Conversely, Epoxy resin offers decreased shrink rate as well as toughness and durability. Phenolic resins impart fast-drying characteristics and good strength retention up to about 200° while an Unsaturated Polyester resin offers good heat stability and slight weight loss up to about 200°. Silicone resins provide outstanding thermal stability as well as a "non-stick" behavior. Urethane Hybrids impart abrasion resistance, toughness, durability, and impact resistance and Vinyl Esters lend durability as well as excellent chemical resistance properties. Liquid Nylon resins are characterized by high impact strength, toughness, flexibility, and abrasion resistance and Polydicyclopentadienes for their impact resistance qualities. Once the cover 22 is applied to the golf ball precursor product, the golf ball 25 or 25' is further processed to form a finished ball as shown in block 58.

The method for manufacturing golf balls described above provides numerous benefits. One such benefit, as described above, is that by pre-heating the core 20 and any boundary layer 21, the cracking of the cover 22 of the golf ball 25 or 25' is substantially minimized or avoided altogether. Also, by pre-heating the core 20 and any boundary layer 21 before forming the cover 22 of the golf ball 25 or 25', the thermal expansion that would otherwise be present in the core and any boundary layer 21 due to the cover forming process is reduced, as these components have already undergone thermal expansion. In addition, the pre-heating substantially prevents the core 20 and boundary layer 21 from acting as a heat sink that drains heat from the cover forming process. This may result in decreased cover molding cycle times of as much as about 30%. Moreover, the pre-heating of the core 20 and any boundary layer 21 also facilitates the demolding of the golf ball 25 or 25' from a die.

EXAMPLES

The following examples demonstrate the efficacy of the present invention in preventing the cracking or fracturing of golf balls, especially multilayer golf balls having a thermoset cover. Golf balls produced in accordance with the co-pending U.S. Pat. No. 6,117,024 however unheated prior to application of the cover, exhibited cracking at the seam of the golf ball. A determination was made that the exothermic reaction to form the thermoset cover was the main cause of the cracking of the golf ball. Cores with boundary layers were produced and pre-heated prior to application of the cover. The results of those experiments are shown in Examples One and Two.

EXAMPLE ONE

Golf ball precursor products consisting of a compression molded core composed of a polybutadiene-based material with an injection molded boundary layer composed of a blend of ionomers were measured cold, that is prior to pre-heating. The cores each had a diameter of 1.54 inches and a Rhiele compression of 82.5. The boundary layers had a Shore D hardness of 65, and the diameter of the core and boundary layer was 1.63 inches. The measurements for Example One are provided in Table Two. The average diameter cold and the average volume cold are provided in Columns I and IV, respectively. The golf ball precursor products were convection heated for at least one hour at a temperature between 120° F. to about 175° F. The average diameter hot and the average volume hot were measured for the golf ball precursor products, and these measurements are provided in Columns II and V, respectively.

The percentage increase in diameter and volume for each golf ball precursor product is provided in Columns III and VI, respectively. A thermoset polyurethane cover was applied to each of the golf ball precursor products subsequent to the pre-heating. The weight, equatorial diameter and compression were measured for each of the covered golf balls and those results are provided in Columns VII, VIII and IX, respectively. The covered golf balls of Example One, all of which were pre-heated prior to application of the cover, did not experience any cracking or fracturing of the cover.

and a Rhiele compression of 79.35. The boundary layers each had a Shore D hardness of 67.5, and the diameter of the core and boundary layer for each golf ball precursor product was 1.63 inches. The measurements for Example Two are provided in Table Three. The average diameter cold and the average volume cold are provided in Columns I and IV, respectively. The golf ball precursor products were convection heated for at least one hour at a temperature between 120° F. to about 175° F. The average diameter hot and the average volume hot were measured for the golf ball precursor products, and these measurements are provided in Columns II and V, respectively. The percentage increase in diameter and volume for each golf ball precursor product is provided in Columns III and VI, respectively. A thermoset polyurethane cover was applied to each of the golf ball TABLE Two

| I Avg. Diameter Cold (in) | II Avg. Diameter Hot (in) | III Avg. Diameter increase | IV Avg. Volume cold | V Avg. Volume Hot | VI Avg. Volume increase | VII Weight with cover | VIII Avg. size with cover | IX Compression with cover |
|---|---|---|---|---|---|---|---|---|
| 1.644 | 1.654 | 0.64% | 2.324 | 2.369 | 1.93% | 46.216 | 1.681 | 107.5 |
| 1.632 | 1.642 | 0.61% | 2.276 | 2.318 | 1.85% | 46.338 | 1.685 | 103.0 |
| 1.644 | 1.654 | 0.61% | 2.324 | 2.367 | 1.84% | 46.087 | 1.681 | 107.5 |
| 1.634 | 1.644 | 0.61% | 2.284 | 2.327 | 1.85% | 46.162 | 1.682 | 107.5 |
| 1.633 | 1.641 | 0.49% | 2.278 | 2.312 | 1.48% | 46.278 | 1.681 | 109.0 |
| 1.634 | 1.641 | 0.43% | 2.282 | 2.312 | 1.29% | 46.342 | 1.684 | 103.5 |
| 1.635 | 1.646 | 0.70% | 2.286 | 2.335 | 2.13% | | | |
| 1.634 | 1.644 | 0.64% | 2.282 | 2.327 | 1.94% | 46.313 | 1.682 | 103.5 |
| 1.633 | 1.643 | 0.61% | 2.280 | 2.322 | 1.85% | 46.283 | 1.681 | 105.0 |
| 1.642 | 1.652 | 0.61% | 2.316 | 2.358 | 1.84% | 46.151 | 1.683 | 105.0 |
| 1.635 | 1.644 | 0.55% | 2.289 | 2.327 | 1.66% | 46.179 | 1.681 | 104.5 |
| 1.631 | 1.641 | 0.61% | 2.270 | 2.312 | 1.85% | 46.367 | 1.679 | 106.5 |
| 1.643 | 1.652 | 0.55% | 2.320 | 2.358 | 1.65% | 46.190 | 1.685 | 105.0 |
| 1.635 | 1.646 | 0.70% | 2.286 | 2.335 | 2.13% | 46.269 | 1.684 | 105.5 |
| 1.635 | 1.644 | 0.55% | 2.286 | 2.324 | 1.66% | 46.179 | 1.683 | 103.5 |
| 1.632 | 1.641 | 0.52% | 2.276 | 2.312 | 1.57% | 46.569 | 1.685 | 102.0 |
| 1.630 | 1.637 | 0.43% | 2.265 | 2.295 | 1.29% | 46.381 | 1.683 | 105.5 |
| 1.631 | 1.639 | 0.46% | 2.272 | 2.303 | 1.39% | 46.500 | 1.686 | 104.5 |

EXAMPLE TWO

Golf ball precursor products consisting of a compression molded core composed of a polybutadiene-based material with an injection molded boundary layer composed of a blend of ionomers were measured cold, that is prior to pre-heating. The cores each had a diameter of 1.52 inches precursor products subsequent to the pre-heating. The weight, equatorial diameter and compression were measured for each of the covered golf balls and those results are provided in Columns VII, VIII and IX, respectively. The covered golf balls of Example One, all of which were pre-heated prior to application of the cover, did not experience any cracking or fracturing of the cover.

TABLE Three

| | Avg. Diameter Cold (in) | Avg. Diameter Hot (in) | Avg. Diameter increase | Avg. Volume cold | Avg. Volume Hot | Avg. Volume increase | Weight with cover | Avg. size with cover | Compression with cover |
|---|---|---|---|---|---|---|---|---|---|
| | 1.631 | 1.644 | 0.80% | 2.270 | 2.324 | 2.41% | 46.507 | 1.685 | 108.5 |
| 2 | 1.630 | 1.641 | 0.64% | 2.268 | 2.312 | 1.94% | 46.506 | 1.682 | 110.0 |
| 3 | 1.631 | 1.642 | 0.67% | 2.272 | 2.318 | 2.04% | 46.603 | 1.680 | 108.0 |
| 4 | 1.630 | 1.640 | 0.61% | 2.268 | 2.310 | 1.85% | 46.544 | 1.683 | 109.5 |
| 5 | 1.632 | 1.643 | 0.67% | 2.276 | 2.322 | 2.04% | 46.628 | 1.677 | 113.5 |
| 6 | 1.631 | 1.641 | 0.61% | 2.270 | 2.312 | 1.85% | 46.501 | 1.680 | 108.0 |
| 7 | 1.630 | 1.639 | 0.58% | 2.265 | 2.305 | 1.76% | 46.573 | 1.678 | 108.5 |
| 8 | 1.632 | 1.641 | 0.52% | 2.276 | 2.312 | 1.57% | 46.640 | 1.679 | 109.5 |
| 9 | 1.629 | 1.640 | 0.64% | 2.263 | 2.307 | 1.95% | 46.574 | 1.677 | 108.0 |
| 10 | 1.631 | 1.643 | 0.74% | 2.270 | 2.320 | 2.22% | 46.568 | 1.678 | 107.5 |
| 11 | 1.628 | 1.638 | 0.61% | 2.257 | 2.299 | 1.85% | 46.537 | 1.678 | 109.0 |
| 12 | 1.628 | 1.640 | 0.74% | 2.257 | 2.307 | 2.23% | 46.484 | 1.683 | 106.5 |
| 13 | 1.632 | 1.643 | 0.64% | 2.276 | 2.320 | 1.94% | 46.655 | 1.681 | 110.5 |
| 14 | 1.630 | 1.641 | 0.68% | 2.265 | 2.312 | 2.04% | 46.458 | 1.682 | 111.0 |
| 15 | 1.631 | 1.642 | 0.67% | 2.272 | 2.318 | 2.04% | 46.504 | 1.682 | 105.0 |
| 16 | 1.632 | 1.643 | 0.64% | 2.276 | 2.320 | 1.94% | 46.599 | 1.679 | 110.5 |
| 17 | 1.631 | 1.641 | 0.64% | 2.270 | 2.314 | 1.94% | 46.505 | 1.680 | 109.5 |
| 18 | 1.630 | 1.640 | 0.58% | 2.268 | 2.307 | 1.76% | 46.621 | 1.683 | 110.5 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method of manufacturing a golf ball comprising:
    forming a core having a diameter ranging from 1.35 inches to 1.64 inches, and applying at least one boundary layer over the core to create a golf ball precursor product, the boundary layer having a thickness of 0.025 inch to 0.075 inch, the core conposed of a polybutadiene material:
    heating the golf ball precursor product such that the golf ball precursor product undergoes volumetric thermal expansion of at least 1.2% and
    applying a cover over the thermally expanded golf ball precursor product, the cover formed by an exothermic reaction.

2. The method according to claim 1 wherein heating the golf ball precursor product comprises convection heating the golf ball precursor product at a temperature within the range of about 120° F. to about 180° F.

3. The method according to claim 2 wherein heating the golf ball precursor product comprises convection heating the golf ball precursor product at a temperature within the range of about 140° F. to about 160° F.

4. The method according to claim 1 wherein heating the golf ball precursor product comprises microwave heating the golf ball precursor product for a predetermined time period.

5. The method according to claim 1 wherein the at least one boundary layer comprises a thermoplastic elastomer.

6. The method according to claim 1 wherein the at least one boundary layer comprises an ionomer.

7. The method according to claim 1 wherein the cover comprises a thermoset material with a resin from the group consisting of Allyl Pthalates like Diallyl Pthalates, (DAP) and Diallyl Iso Pthalates, (DAIP); Aminos; Cyanates; Epoxies; Phenolics; Bismaleimides; Silicones; Liquid Nylon and Polydicyclopentadienes.

8. The method according to claim 2 wherein heating the golf ball precursor product comprises convection heating the golf ball precursor product for about one hour.

9. A method of manufacturing a golf ball comprising:
    forming a core, the core composed of a polybutadiene material and having a diameter ranging from 1.35 inches to 1.64 inches;
    forming at least one boundary layer surrounding the core, the boundary layer having a thickness ranging from 0.025 inch to 0.075 inch;
    heating the core and the at least one boundary layer such that the core and the at least one boundary layer undergo volumetric thermal expansion of at least 1.2%; and
    applying a cover over the thermally expanded core and the at least one boundary layer, and the cover formed by an exothermic reaction.

10. The method according to claim 9 wherein heating the core and the at least one boundary layer comprises convection heating the core and the at least one boundary layer to a temperature within the range of about 120° F. to about 180° F.

11. The method according to claim 10 wherein heating the core and the at least one boundary layer comprises convection heating the core and the at least one boundary layer at temperature within the range of about 140° F. to about 160° F.

12. The method according to claim 10 wherein heating the core and the at least one boundary layer comprises convection heating the core and the at least one boundary layer for about one hour.

13. A method of manufacturing a golf ball comprising:
    heating a golf ball precursor product such that the golf ball precursor product undergoes volumetric thermal expansion of at least 1.2%; and
    applying a cover over the thermally expanded golf ball precursor product
    the cover formed by an exothermic reaction, and
    the cover comprised of a thermoset material with a resin from the group consisting of Allyl Pthalates like Diallyl Pthalates, (DAP) and Diallyl Iso Pthalates, (DAIP); Aminos; Cyanates; Epoxies; Phenolics; Bismaleimides; Silicones; Liquid Nylon and Polydicyclopentadienes.

14. A golf ball having reduced susceptibility of cracking of a cover, the golf ball produced in accordance with the method comprising:
    heating a golf ball precursor product at a predetermined temperature and for a predetermined time period to achieve a predetermined volumetric thermal expansion of the golf ball precursor product; and
    applying a cover over the thermally expanded golf ball precursor product
    the cover comprised of a thermoset material with a resin from the group consisting of Allyl Pthalates like Diallyl Pthalates (DAP) and Diallyl Iso Pthalates (DAIP); Aminos; Cyanates; Epoxies; Phenolics; Unsaturated Polyesters; Bismaleimides; Polyurethanes; Silicones; Urethane Hybrids; Vinyl Esters; Liquid Nylon and Polydicyclopentadienes.

* * * * *